(12) United States Patent
Iazikov et al.

(10) Patent No.: US 7,194,164 B2
(45) Date of Patent: Mar. 20, 2007

(54) DISTRIBUTED OPTICAL STRUCTURES WITH IMPROVED DIFFRACTION EFFICIENCY AND/OR IMPROVED OPTICAL COUPLING

(75) Inventors: Dmitri Iazikov, Springfield, OR (US); Christoph M. Greiner, Eugene, OR (US); Thomas W. Mossberg, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 321 days.

(21) Appl. No.: 10/898,527

(22) Filed: Jul. 22, 2004

(65) Prior Publication Data

US 2005/0078912 A1 Apr. 14, 2005

Related U.S. Application Data

(63) Continuation-in-part of application No. 10/653,876, filed on Sep. 2, 2003, now Pat. No. 6,829,417, which is a continuation-in-part of application No. 10/229,444, filed on Aug. 27, 2002, now Pat. No. 6,678,429, which is a continuation-in-part of application No. 09/811,081, filed on Mar. 16, 2001, now Pat. No. 6,879,441, and a continuation-in-part of application No. 09/843,597, filed on Apr. 26, 2001, now Pat. No. 6,965,464.

(60) Provisional application No. 60/492,438, filed on Aug. 4, 2003, provisional application No. 60/489,470, filed on Jul. 22, 2003, provisional application No. 60/370,182, filed on Apr. 4, 2002, provisional application No. 60/315,302, filed on Aug. 27, 2001, provisional application No. 60/247,231, filed on Nov. 10, 2000, provisional application No. 60/235,330, filed on Sep. 26, 2000, provisional application No. 60/199,790, filed on Apr. 26, 2000, provisional application No. 60/190,126, filed on Mar. 16, 2000.

(51) Int. Cl.
*G02B 6/34* (2006.01)
*G02B 6/12* (2006.01)
*G02B 6/10* (2006.01)
*G02F 1/035* (2006.01)

(52) U.S. Cl. ............................ 385/37; 385/10; 385/14; 385/129

(58) Field of Classification Search .................. None
See application file for complete search history.

(56) References Cited

U.S. PATENT DOCUMENTS 3,995,937 A 12/1976 Baues et al.

(Continued)

FOREIGN PATENT DOCUMENTS

EP 0 310 438 A1 4/1989

(Continued)

OTHER PUBLICATIONS

Capron et al, J. Lightwave Tech., vol. 11 No. 12 pp. 2009-2014 (Dec. 1993).

(Continued)

*Primary Examiner*—Frank G. Font
*Assistant Examiner*—Erin D. Chiem
(74) *Attorney, Agent, or Firm*—David S. Alavi

(57) ABSTRACT

An optical apparatus comprises a planar optical waveguide having at least one set of diffractive elements and confining in at least one transverse spatial dimension optical signals propagating therein. Each diffractive element set routes, between corresponding input and output optical ports, a corresponding diffracted portion of an input optical signal propagating in the waveguide that is successively incident on the diffractive elements and is diffracted by the diffractive element set. The optical signals propagate in the waveguide in corresponding diffractive-region optical transverse modes in regions where the diffractive elements are present, and in corresponding non-diffractive-region optical transverse modes in regions where the diffractive elements are absent. The diffractive element set is adapted so as to yield an operationally acceptable level of either or both of i) optical coupling between corresponding diffractive-region and non-diffractive-region optical transverse modes, and ii) diffraction efficiency of the diffractive element set.

43 Claims, 10 Drawing Sheets

U.S. PATENT DOCUMENTS

| | | |
|---|---|---|
| 4,006,967 A | 2/1977 | Kenan et al. |
| 4,140,362 A | 2/1979 | Tien |
| 4,387,955 A | 6/1983 | Ludman et al. |
| 4,440,468 A | 4/1984 | Auracher et al. |
| 4,660,934 A | 4/1987 | Akiba et al. |
| 4,740,951 A | 4/1988 | Lizet et al. |
| 4,743,083 A | 5/1988 | Schimpe |
| 4,746,186 A | 5/1988 | Nicia |
| 4,773,063 A | 9/1988 | Hunsperger et al. |
| 4,786,133 A | 11/1988 | Gidon et al. |
| 4,803,696 A | 2/1989 | Pepper et al. |
| 4,824,193 A | 4/1989 | Maeda et al. |
| 4,834,474 A | 5/1989 | George et al. |
| 4,846,552 A | 7/1989 | Veldkamp et al. |
| 4,852,960 A | 8/1989 | Alferness et al. |
| 4,923,271 A | 5/1990 | Henry et al. |
| 4,938,553 A | 7/1990 | Maerz et al. |
| 5,040,864 A | 8/1991 | Hong |
| 5,093,874 A | 3/1992 | Hawkins et al. |
| 5,107,359 A | 4/1992 | Ohuchida |
| 5,165,104 A | 11/1992 | Weverka |
| 5,195,161 A | 3/1993 | Adar et al. |
| 5,357,591 A | 10/1994 | Jiang et al. |
| 5,450,511 A | 9/1995 | Dragone |
| 5,453,871 A | 9/1995 | Kolner et al. |
| 5,668,900 A * | 9/1997 | Little et al. .................. 385/37 |
| 5,768,450 A | 6/1998 | Bhagavatula |
| 5,812,318 A | 9/1998 | Babbitt et al. |
| 5,830,622 A | 11/1998 | Canning et al. |
| 5,907,647 A | 5/1999 | Eggleton et al. |
| 5,995,691 A | 11/1999 | Arai et al. |
| 6,011,884 A | 1/2000 | Dueck et al. |
| 6,011,885 A | 1/2000 | Dempewolf et al. |
| 6,137,933 A | 10/2000 | Hunter et al. |
| 6,144,480 A | 11/2000 | Li et al. |
| 6,169,613 B1 | 1/2001 | Amitai et al. |
| 6,169,614 B1 | 1/2001 | Whitcomb et al. |
| 6,266,463 B1 | 7/2001 | Laming et al. |
| 6,285,813 B1 | 9/2001 | Schultz et al. |
| 6,323,970 B1 | 11/2001 | Popovich |
| 6,408,118 B1 | 6/2002 | Ahuja et al. |
| 6,473,232 B2 | 10/2002 | Ogawa |
| 6,553,162 B1 | 4/2003 | Okayama |
| 6,603,901 B1 | 8/2003 | Hale et al. |
| 6,678,429 B2 | 1/2004 | Mossberg et al. |
| 6,702,897 B2 | 3/2004 | Cullen et al. |
| 6,718,093 B2 | 4/2004 | Zhou |
| 6,768,834 B1 | 7/2004 | Gruhlke |
| 6,823,115 B2 | 11/2004 | Greiner et al. |
| 6,829,417 B2 | 12/2004 | Greiner et al. |
| 6,850,670 B2 | 2/2005 | Parhami et al. |
| 6,859,318 B1 | 2/2005 | Mossberg |
| 6,876,791 B2 | 4/2005 | Murashima et al. |
| 6,879,441 B1 | 4/2005 | Mossberg |
| 6,928,223 B2 | 8/2005 | Walpole et al. |
| 6,961,491 B2 | 11/2005 | Greiner et al. |
| 6,965,464 B2 | 11/2005 | Mossberg |
| 6,965,716 B2 | 11/2005 | Greiner et al. |
| 6,985,656 B2 | 1/2006 | Iazikov et al. |
| 6,987,911 B2 | 1/2006 | Mossberg et al. |
| 6,990,276 B2 | 1/2006 | Brice et al. |
| 6,993,223 B2 | 1/2006 | Greiner et al. |
| 7,003,187 B2 | 2/2006 | Frick et al. |
| 7,009,743 B2 | 3/2006 | Mossberg |
| 7,016,569 B2 | 3/2006 | Mule et al. |
| 7,049,704 B2 | 5/2006 | Chakravorty et al. |
| 7,054,517 B2 | 5/2006 | Mossberg et al. |
| 7,062,128 B2 | 6/2006 | Mossberg |
| 7,116,453 B2 | 10/2006 | Mossberg |
| 7,116,852 B2 | 10/2006 | Tuda |
| 7,120,334 B1 | 10/2006 | Greiner et al. |
| 7,123,794 B2 | 10/2006 | Greiner et al. |
| 2002/0071646 A1 | 6/2002 | Eggleton et al. |
| 2003/0011833 A1 | 1/2003 | Yankov et al. |
| 2003/0039444 A1 | 2/2003 | Mossberg et al. |
| 2003/0068113 A1 | 4/2003 | Janz et al. |
| 2003/0117677 A1 | 6/2003 | Mossberg |
| 2004/0076374 A1 | 4/2004 | Greiner et al. |
| 2004/0131360 A1 | 7/2004 | Iazikov et al. |
| 2004/0170356 A1 | 9/2004 | Iazikov et al. |
| 2004/0179779 A1 | 9/2004 | Greiner et al. |
| 2004/0208466 A1 | 10/2004 | Mossberg et al. |
| 2004/0258356 A1 | 12/2004 | Brice et al. |
| 2005/0018951 A1 | 1/2005 | Mossberg et al. |
| 2005/0063430 A1 | 3/2005 | Doucet et al. |
| 2005/0078912 A1 | 4/2005 | Iazikov et al. |
| 2005/0135744 A1 | 6/2005 | Greiner et al. |
| 2005/0135745 A1 | 6/2005 | Greiner et al. |
| 2005/0135747 A1 | 6/2005 | Greiner et al. |
| 2005/0152011 A1 | 7/2005 | Mossberg |
| 2005/0163425 A1 | 7/2005 | Greiner et al. |
| 2005/0196114 A1 | 9/2005 | Xu et al. |
| 2006/0023280 A1 | 2/2006 | Mossberg |
| 2006/0139712 A1 | 6/2006 | Mossberg |
| 2006/0177178 A1 | 8/2006 | Greiner et al. |
| 2006/0193553 A1 | 8/2006 | Mossberg |
| 2006/0210214 A1 | 9/2006 | Uhlhorn et al. |
| 2006/0233493 A1 | 10/2006 | Mossberg |

FOREIGN PATENT DOCUMENTS

| | | |
|---|---|---|
| GB | 2 168 215 A | 6/1986 |
| WO | WO - 99/35523 A1 | 7/1999 |
| WO | WO - 99/56159 A1 | 11/1999 |
| WO | WO 02-075411 | 9/2002 |

OTHER PUBLICATIONS

Deri et al, IEEE Photonics Tech. Lett., vol. 6 No. 2 pp. 242-244 (Feb. 1994).

Grunnet-Jepsen et al, Electon. Lett., vol. 35 No. 13 pp. 1096-1097 (Jun. 1999).

Paddon et al, Opt. Lett., vol. 23 No. 19 pp. 1529-1531 (1998).

Madsen et al, IEEE J. Sel. Top. Quant. Elec., vol. 4 No. 6 pp. 925-929 (Nov./Dec. 1998).

Gini et al, J. Lightwave Tech., vol. 16 No. 4 pp. 625-630 (Apr. 1998).

Day et al, J. Lightwave Tech., vol. 14 No. 8 pp. 1815-1824 (Aug. 1996).

McGreer, IEEE Photonics Tech. Lett., vol. 7 No. 3 pp. 324-326 (Mar. 1995).

Takenouchi et al, Optics Express, vol. 6 No. 6 pp. 124-135 (Mar. 2000).

Grunnett-Jepsen et al, Photonics Tech. Lett., vol. 11 No. 10 p. 1283 (Oct. 1999).

Babbitt et al, Opt. Commun., vol. 148 pp. 23-26 (1998).

Brigham et al, Analysis of scattering from large planar gratings of compliant ctlindrical shells, J. Acoust. Soc. Am., vol. 61 No. 1 pp. 48-59 (Jan. 1977).

Kurokawa et al, Electron. Lett., vol. 33 No. 22 pp. 1890-1891 (Oct. 1997).

Sudbo et al, J. Lightwave Tech., vol. 8 No. 6 pp. 998-1006 (Jun. 1990).

Henry, J. Lightwave Tech., vol. 8 No. 5 pp. 748-755 (May 1990).

Koontz et al, Appl. Phys. Lett., vol. 71 No. 10 pp. 1400-1402 (Sep. 1997).

Song et al, Appl. Opt., vol. 34 No. 26 pp. 5913-5919 (Sep. 1995).

Brazas et al, Appl. Opt., vol. 34 No. 19 pp. 3786-3792 (Jul. 1995).

Bates et al, Appl. Opt., vol. 32 No. 12 pp. 2112-2116 (Apr. 1993).

Wang et al, Appl. Opt., vol. 32 No. 14 pp. 2606-2613 (May 1993).

Magnusson et al, Appl. Phys. Lett., vol. 61 No. 9 pp. 1022-1024 (Aug. 1992).

Ojha et al, Demonstration of low loss integrated InGaAsP/InP demultiplexer device with low polarisation sensitivity, Electron. Lett., vol. 29 No. 9 p. 805 (Apr. 1993).

Li, Opt. Commum., vol. 114 pp. 406-412 (1995).

Soole et al, Electron. Lett., vol. 31 No. 15 pp. 1276-1277 (Jul. 1995).

Rantala et al, Electron. Lett. vol. 34 No. 5 pp. 455-456 (Mar. 1998).

Cowin et al Electron. Lett., vol. 35 No. 13 pp. 1074-1076 (Jun. 1999).

Canning et al, Opt. Commun., vol. 171 pp. 213-217 (1999).

Tien et al, Use of concentric-arc grating as a thin-film spectrograph for guided waves, Am. Inst. of Physics (1980) pp. 524-525.

Kaneko et al, IEEE J. Sel. Top. Quant. Elec., vol. 5 No. 5 pp. 1227-1236 (Sep./Oct. 1999).

Sun et al, IEEE Photonics Tech. Lett., vol. 10 No. 1 pp. 90-92 (Jan. 1998).

McGreer, IEEE Photonics Tech. Lett., vol. 8 No. 4 pp. 551-553 (Apr. 1996).

Avrutsky et al, IEEE Photonics Tech. Lett., vol. 10 No. 6 pp. 839-841 (Jun. 1998).

Alavie et al, IEEE Photonics Tech. Lett., vol. 5 No. 9 pp. 1112-1114 (Sep. 1993).

Fu et al, Opt. Lett., vol. 22 No. 21 pp. 1627-1629 (1997).

Wang et al, IEEE Photonics Tech. Lett., vol. 3 No. 1 pp. 36-38 (Jan. 1991).

Wang et al Opt. Lett., vol. 15 No. 7 pp. 363-365 (Apr. 1990).

Wu et al, J. Lightwave Tech., vol. 10 No. 11 pp. 1575-1589 (Nov. 1992).

Eldada et al, IEEE Photonics Tech. Lett., vol. 12 No. 7 pp. 819-821 (Jul. 2000).

Chen et al, J. Lightwave Tech., vol. 10 No. 7 pp. 888-897 (Jul. 1992).

Minier et al, Diffraction characateristics of superimposed holographic gratings in planar optical waveguides, IEEE Photonics Tech. Lett., vol. 4 No. 10 p. 1115 (Oct. 1992).

Miya, IEEE J. Sel. Top. Quant. Elec., vol. 6 No. 1 pp. 38-45 (Jan./Feb. 2000).

Backlund et al, IEEE Photonics Tech. Lett., vol. 12 No. 3 pp. 314-316 (Mar. 2000).

Wiesman et al, IEEE Photonics Tech. Lett., vol. 12 No. 6 pp. 639-641 (Jun. 2000).

Ura et al, Integrated optical wavelength demultiplexer using a coplanar grating lens, Appl. Opt., vol. 29 No. 9 pp. 1369-1373 (Mar. 1990).

Chen et al, Ten channel single-mode wavelength division demultiplexer in the near IR, Integrated Optical Circuits, vol. 1583 pp. 134-142 (Intl. Soc. Opt. Eng., Boston, MA, USA, Sep. 1991).

Babbitt et al, Opt. Lett., vol. 20 No. 8 pp. 910-912 (Apr. 1995).

Mossberg, Opt. Lett., vol. 26 No. 7 pp. 414-416 (Apr. 2001).

Tang et al, A novel wavelength-division-demultiplexer with optical in-plane to surface-normal conversion, IEEE Photonics Tech. Lett., vol. 7 No. 8 p. 908 (Aug. 1995).

Brady et al, Applied Optics, vol. 30 No. 17 p. 2324 (Jun. 1991).

Preston, "Digital holographic logic", Pattern Recognition, vol. 5, p. 37 (1973).

Hirayama et al, Applied Physics Letters, vol. 69 No. 6 p. 791 (Aug. 5, 1996).

Lohmann et al, Applied Optics, vol. 34 No. 17 p. 3172 (Jun. 10, 1995).

Bedford et al, IEEE Photonics Technology Letters, vol. 12 No. 8 p. 948 (Aug. 2000).

Kristjansson etal, IEEE Photonics Technology Letters, vol. 12 No. 10 p. 1319 (Oct. 2000).

Modh et al, IEEE J. Quantum Electronics, vol. 37 No. 6 p. 752 (Jun. 2001).

Eriksson et al, IEEE J. Quantum Electronics, vol. 34 No. 5 p. 858 (May 1998).

Kazarinov et al, IEEE J. Quantum Electronics, vol. QE-23 No. 9 p. 1419 (Sep. 1987).

Eriksson et al, IEEE Photonics Technology Letters, vol. 9 No. 12 p. 1570 (Dec. 1997).

* cited by examiner

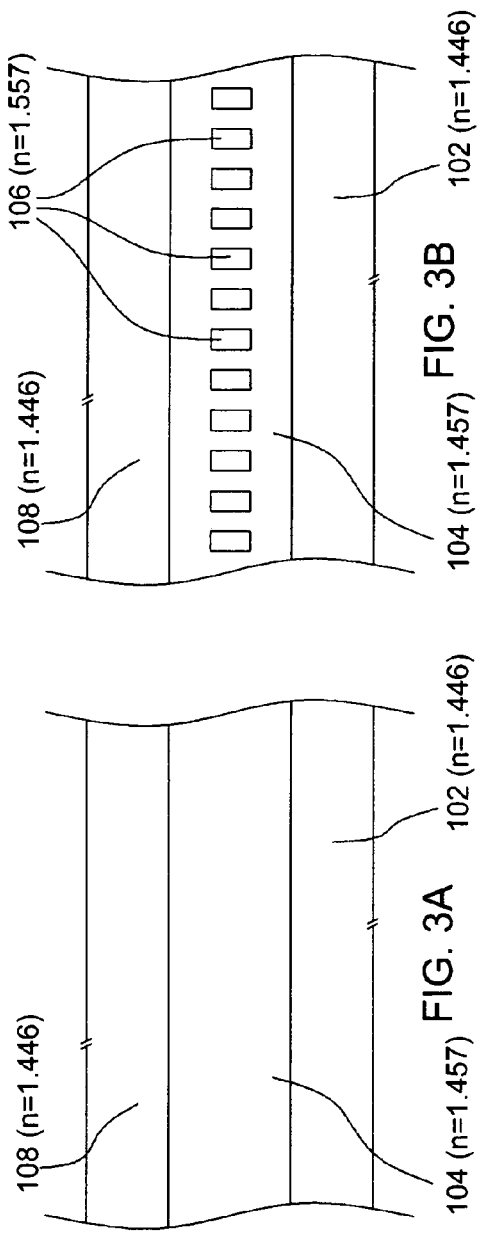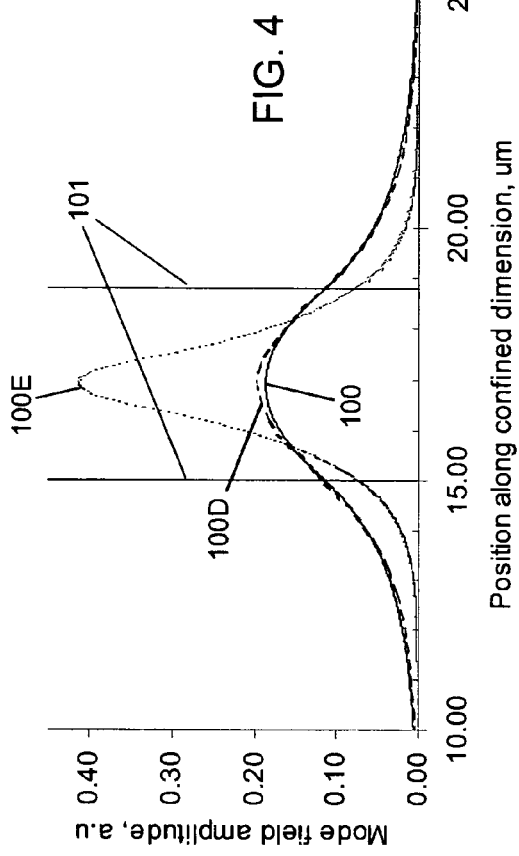

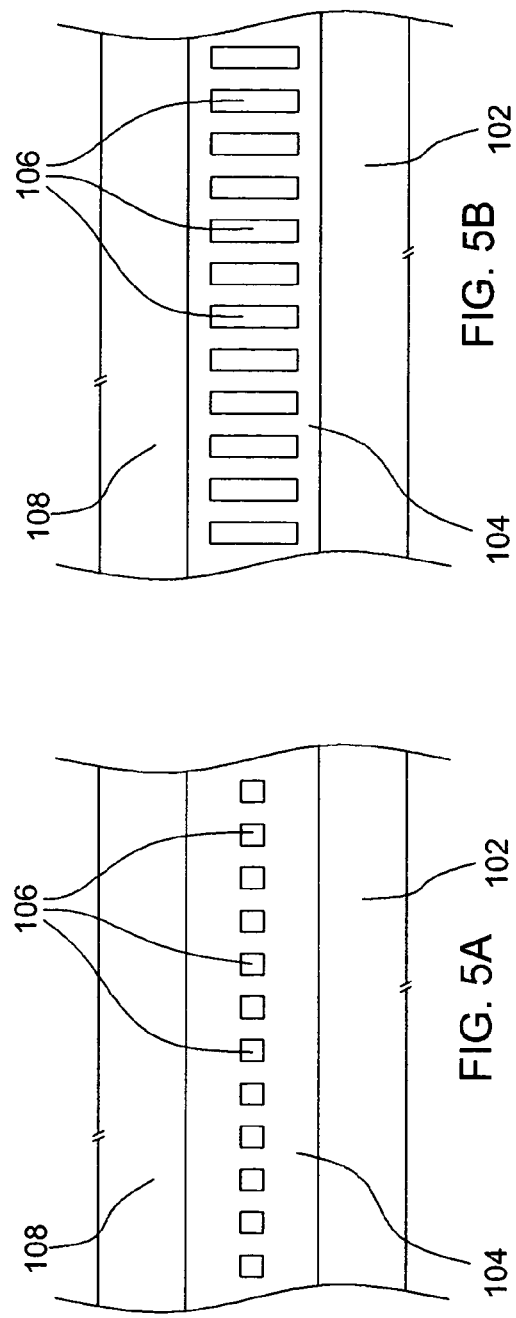
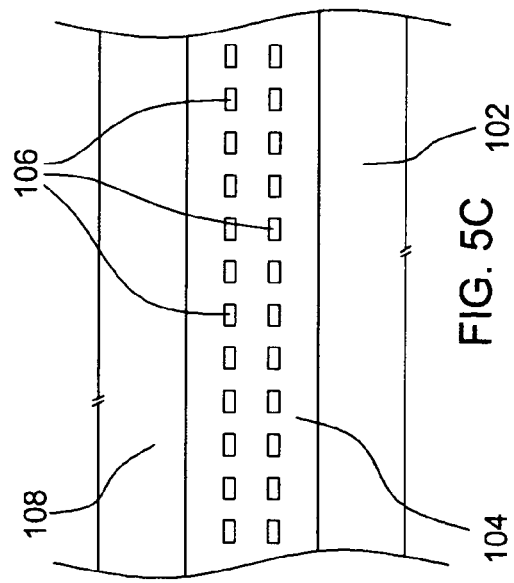
FIG. 5A  FIG. 5B  FIG. 5C

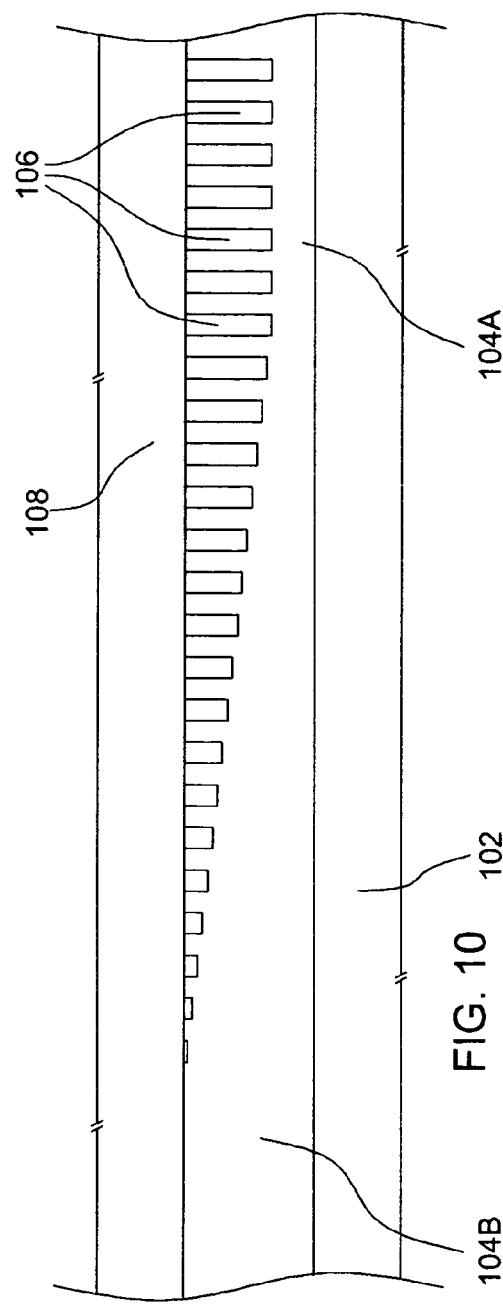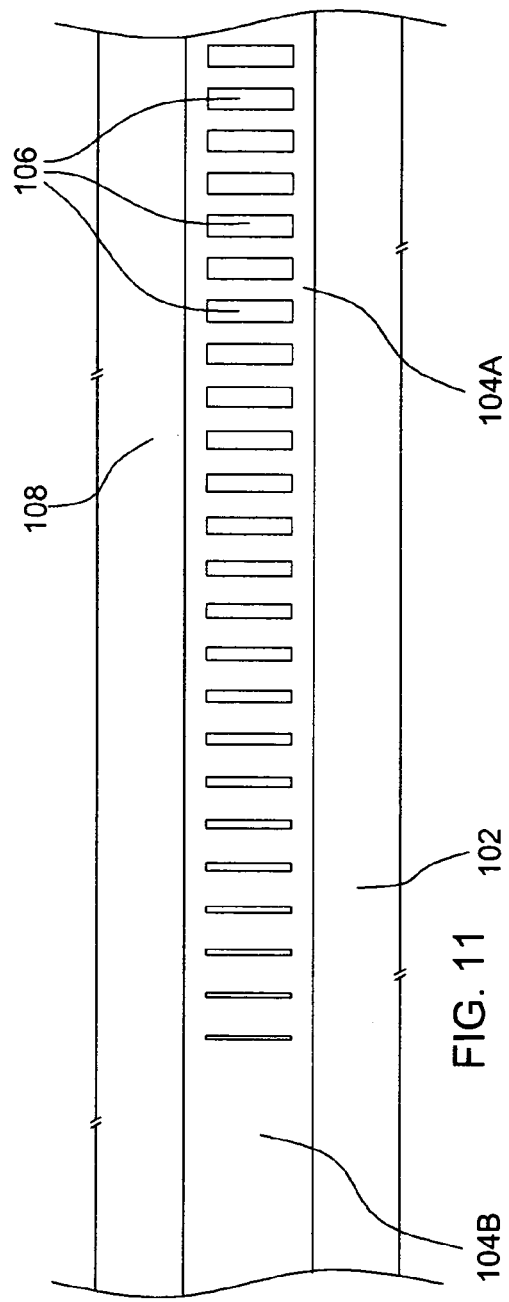

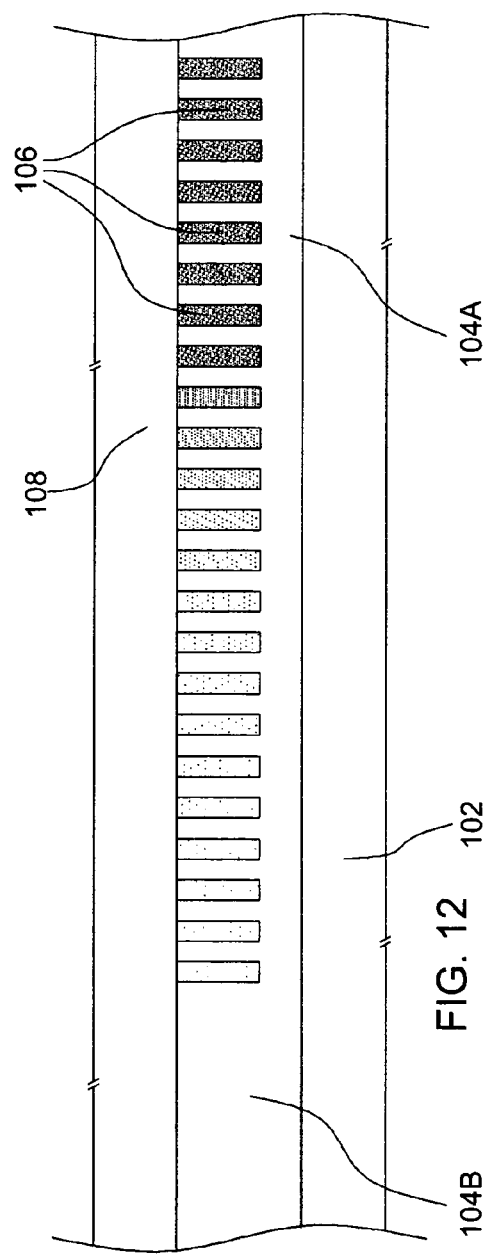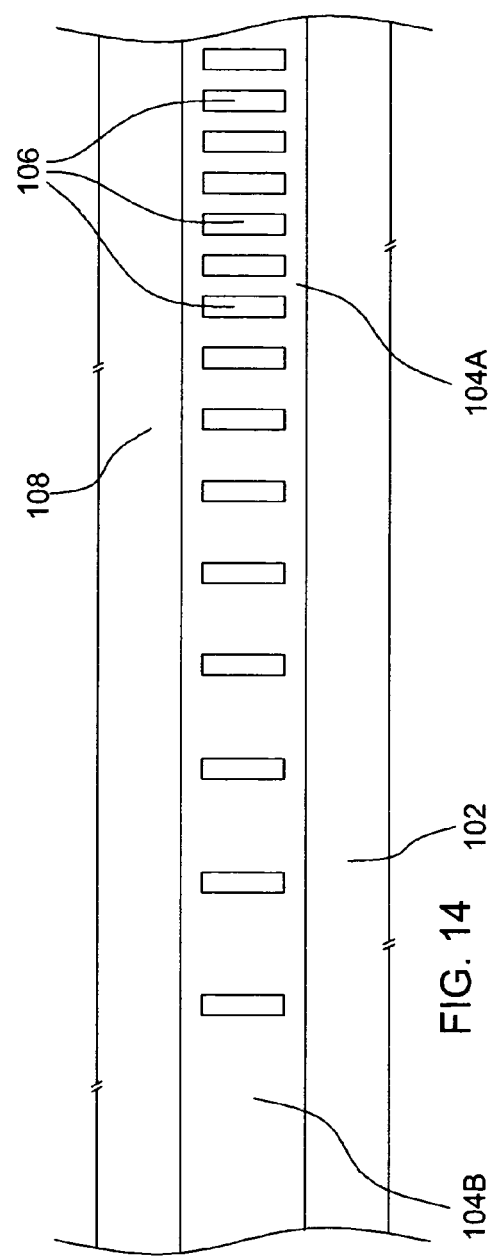

DISTRIBUTED OPTICAL STRUCTURES WITH IMPROVED DIFFRACTION EFFICIENCY AND/OR IMPROVED OPTICAL COUPLING

RELATED APPLICATIONS

This application claims benefit of prior-filed co-pending provisional App. No. 60/489,470 entitled "Efficient distributed Bragg structures in planar waveguides" filed Jul. 22, 2003 in the names of Dmitri Iazikov, Christoph M. Greiner, and Thomas W. Mossberg, said provisional application being hereby incorporated by reference as if fully set forth herein. This application claims benefit of prior-filed co-pending provisional App. No. 60/492,438 entitled "Mode matching of Bragg structures in planar waveguides" filed Aug. 4, 2003 in the names of Dmitri Iazikov, Christoph M. Greiner, and Thomas W. Mossberg, said provisional application being hereby incorporated by reference as if fully set forth herein.

This application is a continuation-in-part of prior-filed co-pending U.S. non-provisional application Ser. No. 10/653,876 entitled "Amplitude and phase control in distributed optical structures" filed Oct. 2, 2003 in the names of Christoph M. Greiner, Dmitri Iazikov, and Thomas W. Mossberg, now Pat. No. 6,829,417 issued Dec. 7, 2004, which is in turn a continuation-in-part of U.S. non-provisional application Ser. No. 10/229,444 entitled "Amplitude and phase control in distributed optical structures" filed Aug. 27, 2002 in the names of Thomas W. Mossberg and Christoph M. Greiner, now Pat. No. 6,678,429 issued Jan. 13, 2004. Each of said application and said patent are hereby incorporated by reference as if fully set forth herein. Application Ser. No. 10/229,444 in turn claims benefit of provisional App. No. 60/315,302 entitled "Effective gray scale in lithographically scribed planar holographic devices" filed Aug. 27, 2001 in the name of Thomas W. Mossberg, and provisional App. No. 60/370,182 entitled "Amplitude and phase controlled diffractive elements" filed Apr. 4, 2002 in the names of Thomas W. Mossberg and Christoph M. Greiner, both of said provisional applications being hereby incorporated by reference as if fully set forth herein.

This application is a continuation-in-part of prior-filed co-pending non-provisional application Ser. No. 09/811,081 entitled "Holographic spectral filter" filed Mar. 16, 2001 in the name of Thomas W. Mossberg, now Pat. No. 6,879,441 issued Apr. 12, 2005, and a continuation-in-part of prior-filed co-pending non-provisional application Ser. No. 09/843,597 entitled "Optical processor" filed Apr. 26, 2001 in the name of Thomas W. Mossberg, now Pat. No. 6,965,464 issued Nov. 15, 2005, application Ser. No. 09/843,597 in turn being a continuation-in-part of said application Ser. No. 09/811,081. Said application No. 09/811,081 in turn claims benefit of: 1) provisional App. No. 60/190,126 filed Mar. 16, 2000; 2) provisional App. No. 60/199,790 filed Apr. 26, 2000; 3) provisional App. No. 60/235,330 filed Oct. 26, 2000; and 4) provisional App. No. 60/247,231 filed Nov. 10, 2000. Each of said non-provisional applications and each of said provisional applications are hereby incorporated by reference as if fully set forth herein.

BACKGROUND

The field of the present invention relates to optical devices incorporating distributed optical structures. In particular, methods and apparatus for improving efficiency and/or improved spatial mode matching are disclosed herein.

SUMMARY

An optical apparatus comprises a planar optical waveguide having at least one set of diffractive elements. The planar optical waveguide substantially confines in at least one transverse spatial dimension optical signals propagating therein. Each diffractive element set routes, between corresponding input and output optical ports, a corresponding diffracted portion of an input optical signal propagating in the planar waveguide that is diffracted by the diffractive element set. The input optical signal is successively incident on the diffractive elements. The optical signals propagate in the planar waveguide in corresponding diffractive-region optical transverse modes in regions of the planar waveguide where the diffractive elements are present, and in corresponding non-diffractive-region optical transverse modes in regions of the planar waveguide where the diffractive elements are absent. The diffractive element set is adapted so as to yield an operationally acceptable level of either or both of i) optical coupling between corresponding diffractive-region and non-diffractive-region optical transverse modes, and ii) diffraction efficiency of the diffractive element set.

The adaptation of the diffractive element set may include one or more of the following. The diffractive elements may have sufficiently large transverse extent in the confined dimension so as to substantially suppress optical coupling between diffractive-region optical modes and non-confined optical modes (thereby increasing efficiency). The diffractive elements may be positioned in the confined dimension so as to spatially overlap the diffracting-region optical mode at or near a spatial maximum of the amplitude thereof (thereby increasing efficiency). The diffractive elements may have sufficiently large refractive index and sufficiently large transverse extent in the confined dimension so as to yield diffractive-region optical modes that substantially spatially overlap the diffractive elements (thereby increasing efficiency). A planar waveguide core in a non-diffracting region of the planar waveguide may be offset in the confined dimension relative to a planar waveguide core in a diffracting region of the planar waveguide (thereby improving mode-matching). A planar waveguide core in the non-diffracting region may differ in transverse extent, in the confined dimension, from a planar waveguide core in a diffracting region of the planar waveguide (thereby improving mode-matching). A planar waveguide core in the non-diffracting region may have a refractive index higher than a refractive index of a planar waveguide core in the diffracting region and lower than a refractive index of the diffractive elements (thereby improving mode-matching). The planar waveguide may include a transition region of the planar waveguide between the diffracting region and the non-diffracting region wherein: a less-than-unity fill factor for the diffractive elements increases from the non-diffracting region toward the diffracting region; number density of the diffractive elements increases from the non-diffracting region toward the diffracting region; transverse extent in the confined dimension of the diffractive elements increases from the non-diffracting region toward the diffracting region; longitudinal extent of the diffractive elements increases from the non-diffracting region toward the diffracting region; and/or refractive index of the diffractive elements increases from the non-diffracting region to the diffracting region (any one or more of these variations thereby improving mode-matching). These adaptations may be implemented alone or in any combination in a particular planar waveguide.

Objects and advantages pertaining to diffractive element sets in planar optical waveguides may become apparent upon referring to the disclosed embodiments as illustrated in the drawings and disclosed in the following written description and/or claims.

BRIEF DESCRIPTION OF THE DRAWINGS

FIGS. 3A–3D are schematic longitudinal sections of planar waveguides.

FIG. 4 shows the corresponding transverse mode profiles for the waveguides of FIGS. 1D and 3A–3B.

FIGS. 5A–5C are schematic longitudinal sections of planar waveguides.

FIG. 10 is a schematic longitudinal section of a planar waveguide.

FIG. 11 is a schematic longitudinal section of a planar waveguide.

FIG. 12 is a schematic longitudinal section of a planar waveguide.

FIG. 14 is a schematic longitudinal section of a planar waveguide.

Figure 1A:
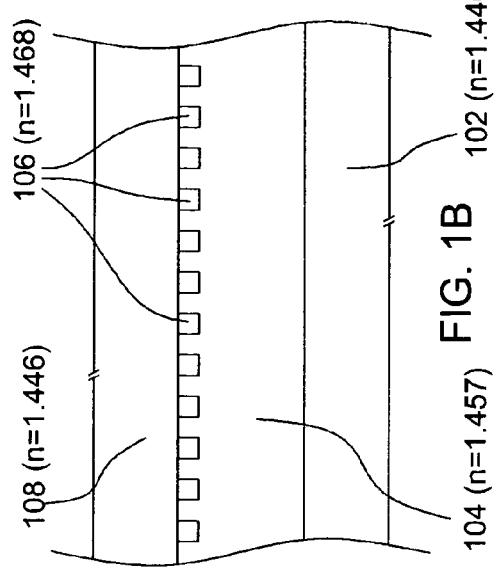
FIGS. 1A–1D are schematic longitudinal sections of planar waveguides.

The embodiments shown in the Figures are exemplary, and should not be construed as limiting the scope of the present disclosure and/or appended claims.

DETAILED DESCRIPTION OF EMBODIMENTS

An optical apparatus according to the present disclosure comprises a planar optical waveguide having at least one set of diffractive elements. The planar optical waveguide substantially confines in at least one transverse dimension optical signals propagating therein, and is generally formed on or from a substantially planar substrate of some sort. The confined optical signals typically propagate as transverse optical modes supported or guided by the waveguide. These optical modes are particular solutions of the electromagnetic field equations in the space occupied by the waveguide. The planar waveguide may comprise a slab waveguide (substantially confining in one transverse dimension an optical signal propagating in two dimensions therein), or may comprise a channel waveguide (substantially confining in two transverse dimension an optical signal propagating in one dimension therein). It should be noted that the term "planar waveguide" is not used consistently in the literature; for the purposes of the present disclosure and/or appended claims, the term "planar waveguide" is intended to encompass both slab and channel waveguides.

The planar waveguide typically comprises a core surrounded by lower-index cladding (often referred to as upper and lower cladding, or first and second cladding; these may or may not comprise the same materials). The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) A planar waveguide may support one or more transverse modes, depending on the dimensions and refractive indices of the core and cladding. A wide range of material types may be employed for fabricating a planar waveguide, including but not limited to glasses, polymers, plastics, semiconductors, combinations thereof, and/or functional equivalents thereof. The planar waveguide may be secured to a substrate, for facilitating manufacture, for mechanical support, and/or for other reasons. A planar waveguide typically supports or guides one or more optical modes characterized by their respective amplitude variations along the confined dimension.

The set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a directional photonic-bandgap structure; a mode-selective photonic crystal; or other equivalent terms of art. Each diffractive element of the set diffracts, reflects, scatters, or otherwise redirects a portion of an incident optical signal (said process hereinafter simply referred to as diffraction). Each diffractive element of the set typically comprises some suitable alteration of the planar waveguide (ridge, groove, index modulation, density modulation, and so on), and is spatially defined by a virtual one- or two-dimensional curvilinear diffractive element contour, the curvilinear shape of the contour typically being configured to impart desired spatial characteristics onto the diffracted portion of the optical signal. Implementation of a diffractive element with respect to its virtual contour may be achieved in a variety of ways, including those disclosed in the references cited hereinabove. Each curvilinear diffractive element is shaped to direct its diffracted portion of the optical signal to an output optical port. The relative spatial arrangement (e.g. longitudinal spacing) of the diffractive elements of the set, and the amplitude diffracted from each diffractive element of the set, yield desired spectral and/or temporal characteristics for the overall diffracted optical signal routed between the input and output optical ports. It should be noted that optical ports (input and/or output) may be defined structurally (for example, by an aperture, waveguide, fiber, lens, or other optical component) and/or functionally (i.e., by a spatial location, convergence/divergence/collimation, and/or propagation direction). For a single-mode planar waveguide, such a set of diffractive elements may be arranged to yield an arbitrary spectral/temporal transfer function (in terms of amplitude and phase). In a multimode planar waveguide, modal dispersion and mode-to-mode coupling of diffracted portions of the optical signal may limit the range of spectral/temporal transfer functions that may be implemented.

The curvilinear diffractive elements of the set (or equivalently, their corresponding contours) are spatially arranged with respect to one another so that the corresponding portions of the optical signal diffracted by each element interfere with one another at the output optical port, so as to impart desired spectral and/or temporal characteristics onto the portion of the optical signal collectively diffracted from the set of diffractive elements and routed between the input and output optical ports. The diffractive elements in the set are arranged so that an input optical signal, entering the planar waveguide through an input optical port, is successively incident on diffractive elements of the set. For the purposes of the present disclosure and/or appended claims, "successively incident" shall denote a situation wherein a wavevector at a given point on the wavefront of an optical signal (i.e., a wavefront-normal vector) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal, and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

The set of diffractive elements provides dual functionality, spatially routing an optical signal between an input optical port and an output optical port, while at the same time acting to impart a spectral/temporal transfer function onto the input optical signal to yield an output optical signal. The curvilinear diffractive elements may be designed (by computer generation, for example) so as to provide optimal routing, imaging, or focusing of the optical signal between an input optical port and a desired output optical port, thus reducing or minimizing insertion loss. Simple curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references cited hereinabove. The following are exemplary only, and are not intended to be exhaustive.

Diffractive elements may be formed lithographically on the surface of a planar optical waveguide, or at one or both interfaces between core and cladding of a planar optical waveguide. Diffractive contours may be formed lithographically in the interior of the core layer and/or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter (described further hereinbelow). The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. Essentially, each diffractive element contour may be optimized to image the input port onto the output port in a phase coherent manner. Inputs to the design are the detailed structure of the input and output optical ports and their locations. Standard ray tracing approaches to optical element design may provide a diffractive contour at each optical distance into the planar waveguide that will provide an optimal imaging of the input signal at the input port onto the optimal output signal at the output port. Simple curves may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between diffracted components at the output port, and/or the diffractive strength of the elements may be individually controlled as well (as described in detail in the references cited hereinabove).

An alternative approach to designing the diffractive element contours for a diffractive element set is to calculate interference patterns between simulated fields at a desired wavelength and with desired waveforms entering the input port and exiting the output port. In forming or writing a summed pattern for the diffractive element set, suitable discretization is applied as needed for any lithographic or UV exposure approach that is utilized for fabrication. The holographic structure may be designed by interference of computer-generated beams having the desired computer-generated temporal waveforms, with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform.

In an alternative method for making the diffractive element structure, the core consists of a material of appropriate index that is also photosensitive at the wavelength of the desired operational signal beams. As in traditional holography, the input and output recording beams (same wavelength as operational signal beams of the envisioned device) are overlapped in the core and the interference pattern between them is recorded. Subsequently the core material is developed and, if necessary, a cladding may be deposited or attached by other means.

The phrase "operationally acceptable" appears herein describing levels of various performance parameters of planar waveguides and diffractive element sets thereof. Such parameters may include optical coupling coefficient (equivalently, optical coupling efficiency), diffraction efficiency, undesirable optical mode coupling, optical loss, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, a lower optical coupling efficiency may be an acceptable trade-off for achieving lower device fabrication costs in some instances, while higher optical coupling may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "so as to substantially avoid undesirable optical coupling", and so on as used herein shall be construed in light of this notion of "operationally acceptable" performance.

Diffraction Efficiency

In order to increase the overall diffraction efficiency of a set of diffractive elements without increasing the size of the device or the number of diffractive elements, the diffraction efficiency of individual diffractive elements must be enhanced. This may be achieved by positioning the diffractive element at a position where the optical mode to be diffracted has larger amplitude, by increasing the transverse extent of the diffractive element so as to overlap a larger fraction of the mode profile, and/or by using materials to form the diffractive elements having a refractive index higher than the core (the perturbation of the mode structure by the presence of the higher-index diffractive element increasing the mode amplitude that overlaps the diffractive elements). FIGS. 1A–1D and 2A–2B illustrate schematically the effect of such adaptations.

In each of FIGS. 1A–1D, the planar waveguide comprises cladding 102, core 104, diffractive elements 106, and cladding 108, shown in a longitudinal sectional view with propagation of optical signals oriented in the plane of the drawing. In the exemplary embodiments, the cladding layers comprise undoped silica (n=1.446), and the core comprises Ge-doped silica (n=1.457) about 4 µm thick. The diffractive elements 106 are about 0.265 µm wide and have a period of about 0.53 µm (resonant diffracted wavelength about 1.54 µm. The index, position, and transverse extent of the diffractive elements 106 vary among the examples. A figure of merit for comparing diffraction efficiency is $L_{1/e}$, the length over which a optical signal must propagate through the waveguide before decreasing to 1/e of its initial field amplitude.

Figure 1B:
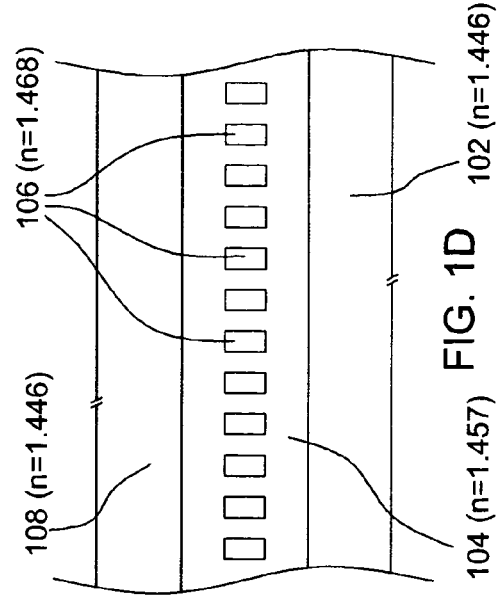
Figure 1C:
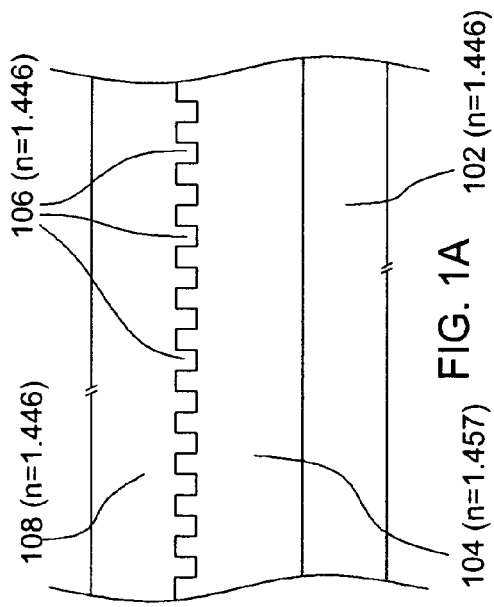
Figure 1D:
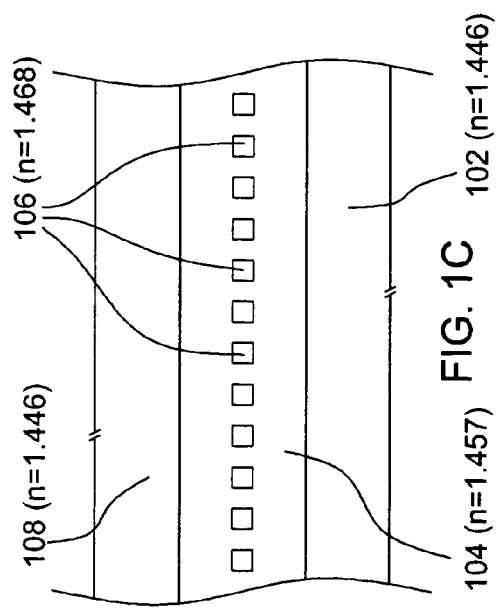
Figure 2A:
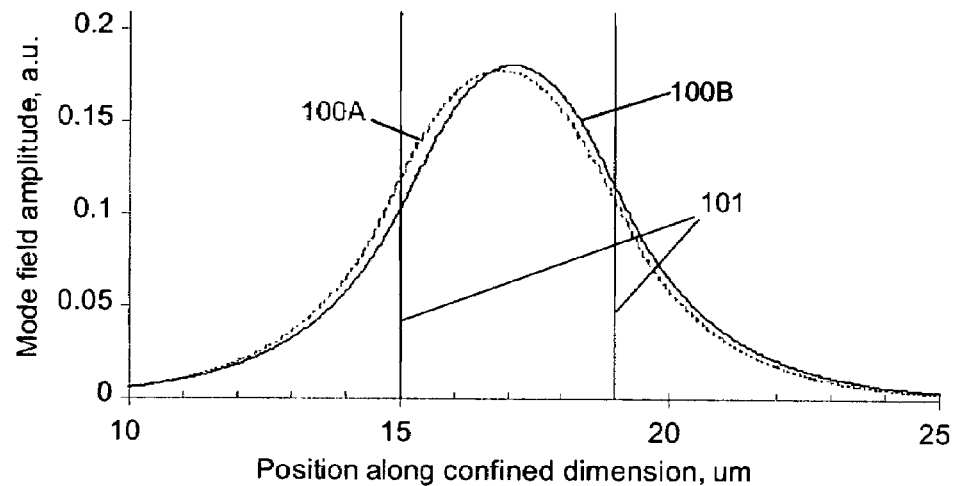
FIGS. 2A–2B show the corresponding transverse mode profiles for the waveguides of FIGS. 1A–1D.
Figure 2B:
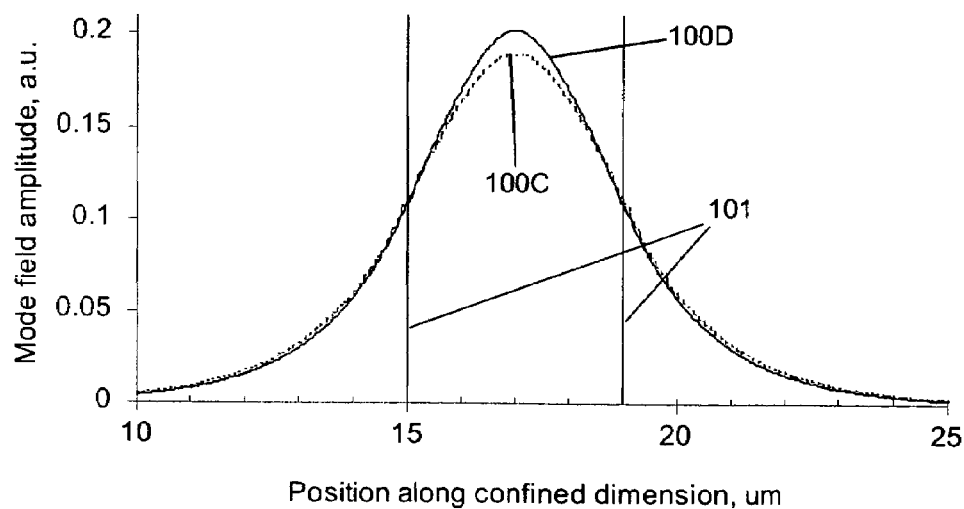

In FIG. 1A, the diffractive elements 106 comprise grooves in the surface of the core about 0.4 µm deep and filled with cladding material. The corresponding transverse mode profile 100A (in the confined direction) is shown in FIG. 2A, along with the core/cladding boundaries 101. The resulting $L_{1/e}$ is about 1.73 mm. In FIG. 1B, the diffractive elements are the same size and in the same position as in FIG. 1A, but the grooves are filled with doped silica (n=1.468, larger than the core index). The corresponding transverse mode profile 100B (in the confined direction) is shown in FIG. 2A. The resulting $L_{1/e}$ is about 1.31 mm. In FIG. 1C, the diffractive elements 106 are the same size and index as in FIG. 1B, but are positioned within the core 104 substantially symmetrically (in the confined dimension). The corresponding transverse mode profile 100C (in the confined dimension) is shown in FIG. 2B, and is considerably narrower than the profiles of FIG. 2A. The resulting $L_{1/e}$ is about 0.66 mm. In FIG. 1D, the diffractive elements 106 have the same index and are in the same position as in FIG. 1C, but are about 1 µm in transverse extent. The corresponding transverse mode profile 100D (in the confined dimension) is shown in FIG. 2B. The resulting $L_{1/e}$ is about 0.25 mm. By increasing the index of the diffractive elements, by moving them to the center of the waveguide core (presumably to overlap the maximum amplitude of a supported optical mode), and by increasing the transverse extent, a factor of about 7 improvement is achieved for the diffraction efficiency of the diffractive element set. The presence of higher index material in the diffractive elements serves to perturb the supported mode so as to increase the mode amplitude at the diffractive element. Moving the diffractive elements to the mode amplitude maximum and increasing the transverse extent of the diffractive elements also increase mode amplitude at the diffractive element, thereby also increasing diffraction efficiency. Many other combinations of materials, positions, and dimensions may be implemented increasing diffraction efficiency within the scope of this disclosure and/or the appended claims.

Still further improvement in diffraction efficiency may be achieved by employing material with an even larger refractive index to form the diffractive elements 106. In FIG. 3B, a planar waveguide is shown comprising undoped silica (n=1.446) cladding 102 and 108, Ge-doped silica (n=1.457) core 104, and silicon oxynitride (n=1.557) diffractive elements 106. The core is about 3.8 μm thick. The diffractive elements are about 1 μm deep, about 0.265 μm wide, and have a period of about 0.53 μm. In a non-diffracting region of the planar waveguide (FIG. 3A), all materials and dimensions are the same, except that the diffractive elements are missing. The resulting mode profiles are shown in FIG. 4, where profile 100 is the non-diffracting-region mode, profile 100D is the same as that shown in FIG. 1D, and trace 100E is the diffractive-region mode of the waveguide of FIG. 3B. Note that the profile 100E (supported in part by the silicon oxynitride core) is substantially narrower than the other profiles. This leads to significantly enhanced diffraction efficiency, as evidenced by $L_{1/e}$ of about 0.015 mm (about 15 μm). This may also lead to reduced optical coupling (i.e. optical loss) between the diffracting-region optical mode and the non-diffracting-region optical mode. This mode mismatch is addressed hereinbelow.

In addition to increasing the diffraction efficiency of a diffractive element set, increasing the transverse extent (in the confined dimension) of the diffractive elements also serves to reduce coherent optical coupling into non-confined optical modes (so-called out-of-plane modes). For a first-order diffractive element set (diffractive element period=½×in-waveguide resonant wavelength), there are no higher-order coherent out-of-plane optical modes at the resonant wavelength of the diffractive element set (although there may be some coupling of detuned optical signals into cladding modes of the waveguide). For higher-order diffractive element sets (diffractive element period=n/2×in-waveguide resonant wavelength, for n=2, 3, . . . ), there are out-of-plane optical modes to which a confined mode could be optically coupled by the diffractive element set. For example, a second-order diffractive element set may optically couple a confined mode and out-of-plane modes at ±90°. In another example, a third-order diffractive element set may optically couple a confined optical mode with out-of-plane modes at ±70° and ±110°. Other angles for other orders and/or for other waveguides may be readily calculated by those skilled in the art. Any coupling into such non-confined optical modes manifests itself as optical loss, or equivalently, reduced diffraction efficiency.

Figure 6A:
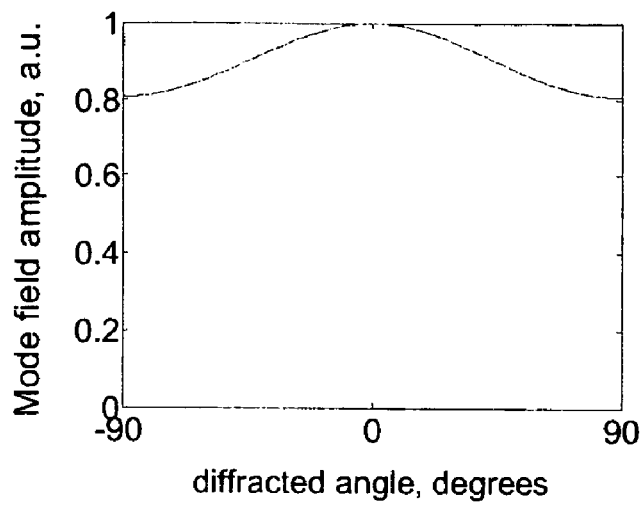
FIGS. 6A–6B show the corresponding transverse mode profiles for the waveguides of FIGS. 5A–5C.
Figure 6B:
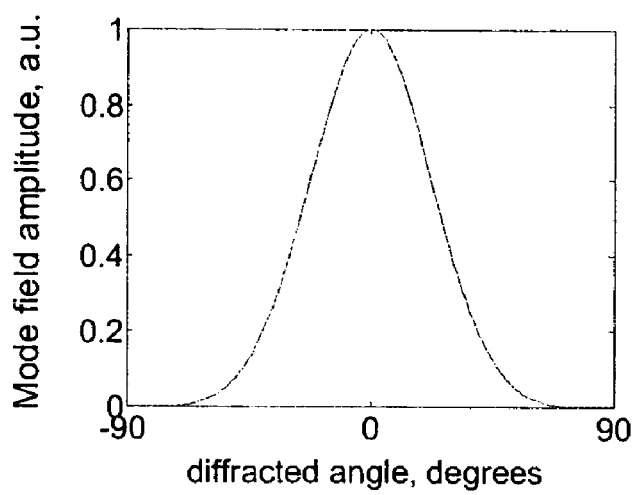

Diffraction of optical signals from diffractive elements within a planar waveguide depends not only on the spatial period of the diffractive elements, but also on their transverse extent (in the confined dimension). Each point on each diffractive element behaves as a coherent scattering source, which limit the angular dependence of the scattering. For example, for a lowest-order mode propagating in a planar waveguide, the range of angles over which light is diffracted is given approximately by $\pm\lambda/2n_{eff}d$, where λ is the vacuum wavelength, $n_{eff}$ is the effective index of the waveguide, and d is the transverse extent of the diffractive element. In the example of FIG. 5A, d is about λ/4, and a diffractive element therefore scatters light over an angular range that has significant amplitude at ±90° (FIG. 6A). Such an arrangement would not serve to substantially suppress optical coupling into out-of-plane optical modes. As d increases, the range of diffracted angles decreases. By making d sufficiently large, the range of back-diffracted angles may be made smaller than the angles available for out-of-plane coherent diffraction. For example, for d≈λ (FIG. 5B), the range of diffracted angles is about ±30° (FIG. 6B), which is sufficiently small to substantially suppress many if not all out-of-plane scattering processes.

Figure 6C:
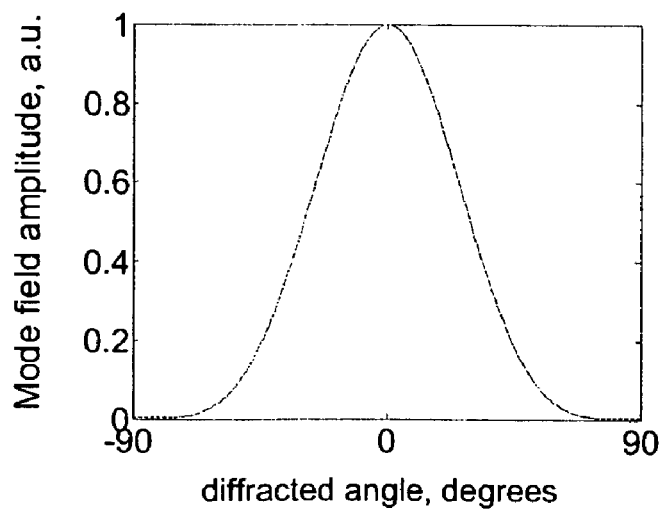

If fabrication of diffractive elements having a transverse extent sufficiently large to substantially suppress out-of-plane diffraction is problematic, another approach is available. The diffracted angular range was calculated approximately from the first minimum in the angular dependence of scatter or diffraction. If it is not possible to suppress all likely out-of-plane mode coupling, the transverse extent of the diffractive element may be chosen so as to position a minimum of the diffracted signal angular distribution at the angle of a likely or troublesome out-of-plane diffraction process. The appropriate size may be readily calculated by those familiar with the theory of diffraction. Similarly, the diffractive element may comprise multiple segments positioned along the confined dimension of the planar waveguide (FIG. 5C; d≈λ/8 and the segments are separated by about 3λ/8 along the confined dimension), and relatively positioned and sized so as to result in a sufficiently small range of diffracted angles (FIG. 6C), or a minimum diffracted amplitude at a diffracted angle substantially coinciding with a diffraction angle for optical coupling between a diffractive-region optical mode and a non-confined optical mode.

Mode-Matching

As has already been described hereinabove, the presence of diffractive elements in a region of the planar waveguide may alter the size, shape, and/or position of a supported optical mode in that region, relative to a supported optical mode in regions lacking diffractive elements. As already noted, this phenomenon may be exploited to increase the diffraction efficiency of a diffractive element set. An optical mode supported by the planar waveguide in a diffractive region shall be referred to as a diffractive-region optical mode. Similarly, an optical mode supported by the planar waveguide in a non-diffractive region shall be referred to herein as a non-diffractive-region optical mode. Differences between the spatial characteristics of the diffractive-region and non-diffractive-region modes may reduce optical coupling therebetween due to mode mismatch, in which case an optical signal propagating between the diffracting region and the non-diffracting region of the planar waveguide would suffer an optical loss. This optical loss may be negligible for weakly diffracting elements, but becomes more severe as the diffractive elements diffract more strongly (often as a result of a larger index of refraction of the diffractive elements), or if there are multiple dissimilar regions in the planar waveguide with different sets of diffractive elements and/or non-diffractive regions in the path of the optical signal.

Figure 7:
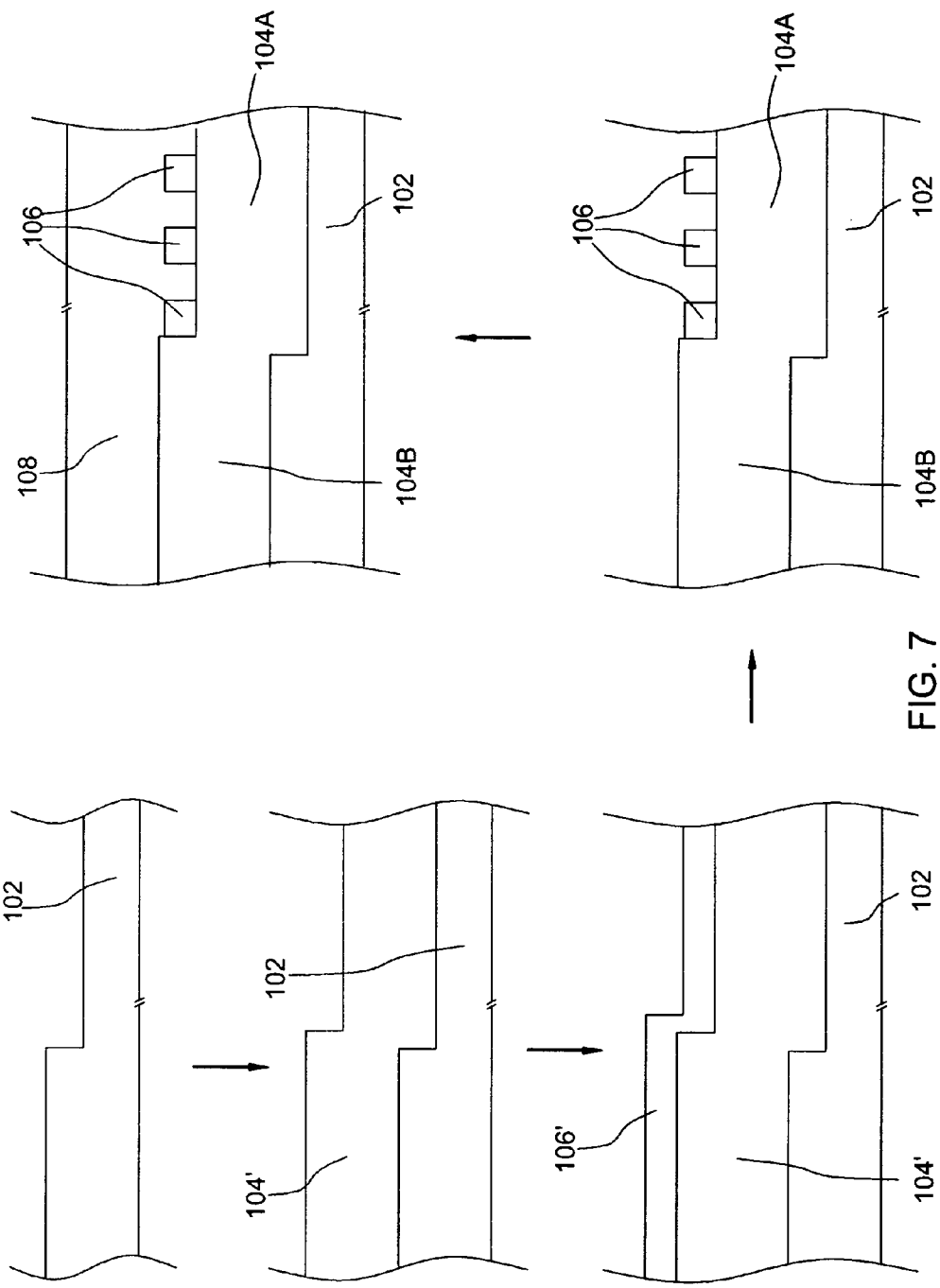
FIG. 7 illustrates schematically a fabrication sequence for a planar waveguide.

Mode-matching between the diffracting-region and non-diffracting-region optical modes may be improved, and optical losses reduced to an operationally acceptable level, by implementing one or more suitable adaptations of the planar waveguide. If the diffractive elements are not positioned symmetrically in the confined dimension (as is the case, for example, when the diffractive elements are formed at one core/cladding interface), the diffractive-region optical mode will be transversely displaced along the confined dimension. If the diffractive elements have a higher index than the core (grooves filled with higher-index material, for example), then the diffractive-region mode will be shifted toward the diffractive elements. If the diffractive elements have a lower index than the core (grooves filled with cladding, for example), then the diffractive-region mode will be shifted away from the diffractive elements. If the core of the diffractive and non-diffractive regions of the waveguide are at the same position along the confined dimension, the corresponding diffractive-region and non-diffractive-region modes will be transversely offset from one another, resulting in reduced optical coupling therebetween. A relative offset of the cores by the appropriate distance may bring the modes into substantial alignment, and may increase optical coupling between the modes (i.e. reduce optical loss) to an operationally acceptable level. An exemplary fabrication sequence for producing such an offset is schematically illustrated in FIG. 7, wherein the offset is formed in the lower cladding layer 102 prior to deposition of core material layer 104' and diffractive element material layer 106'. Lithography or other spatially selective processing may be employed to form diffractive elements 106 and to form cores 104A (diffractive region) and 104B (non-diffractive region). The upper cladding layer 108 is then deposited over the cores and diffractive elements. Any suitable fabrication technique(s) may be employed. Exemplary materials and dimensions for such an embodiment, and simulation results therefor, are as follows. Cladding 102 and 108 comprise undoped silica (n=1.446); cores 104A and 104B each comprise Ge-doped silica (n=1.457) about 2 µm thick; diffractive elements 106 comprise silicon oxynitride (n=1.53) filling grooves etched into the surface of core 104A about 0.75 µm wide, 0.265 µm deep, and with a period of about 0.53 µm (resonant diffracted wavelength about 1.54 µm). With no offset between cores 104A and 104B, optical coupling between the modes is about 66% (optical loss about 1.8 dB). If the core 104B is offset by about 1 µm toward the diffractive elements 106, the optical coupling between the modes is about 93% (optical loss about 0.3 dB). Many other suitable combinations of materials, dimensions, and offset may be implemented, and shall fall within the scope of the present disclosure and/or appended claims.

Figure 8:
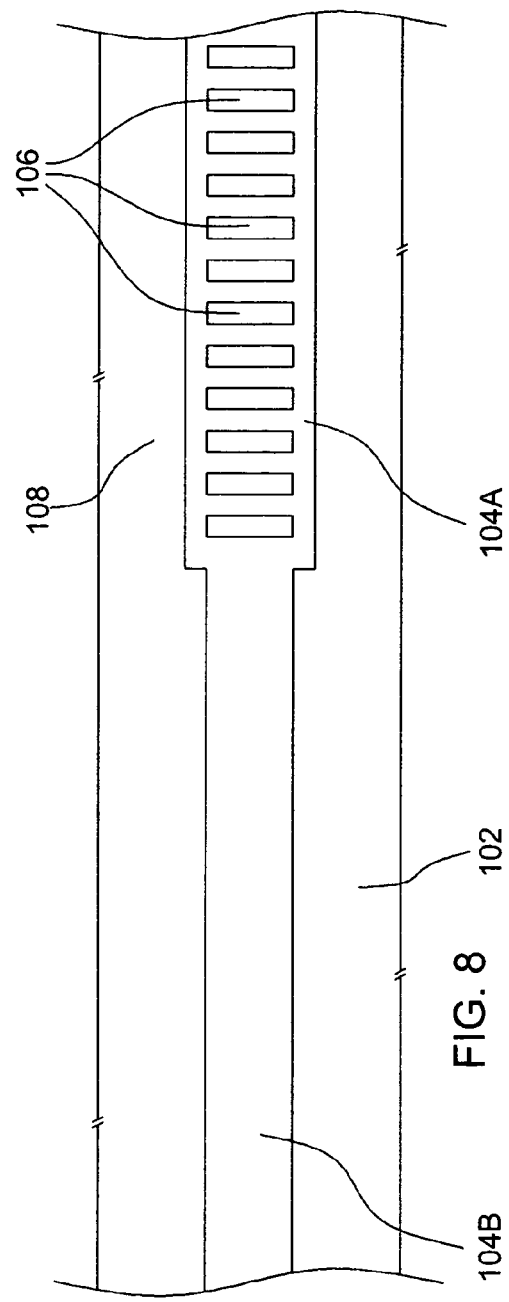
FIG. 8 is a schematic longitudinal section of a planar waveguide.

The presence of diffractive elements may also change the size (i.e., transverse extent) of an optical mode in the diffracting region, relative to a mode in the non-diffracting region. If the refractive index of the diffractive elements 106 is larger than that of the core 104A, a smaller transverse mode size results, while diffractive elements having a refractive index smaller than that of the core result in a larger transverse mode size. Such mode size differences result in decreased optical coupling, or equivalently, increased optical loss. As shown schematically in the exemplary embodiment of FIG. 8, cores 104A and 104B may be formed with differing transverse extents along the confined dimension. The sizes of the cores 104A and 104B may be chosen so as to yield substantially similar transverse mode sizes for the diffracting-region and non-diffracting-region optical modes, and may increase optical coupling between the modes (i.e. reduce optical loss) to an operationally acceptable level. It should be noted that relative offset and size differences of the cores may be implemented alone or in combination.

Figure 9:
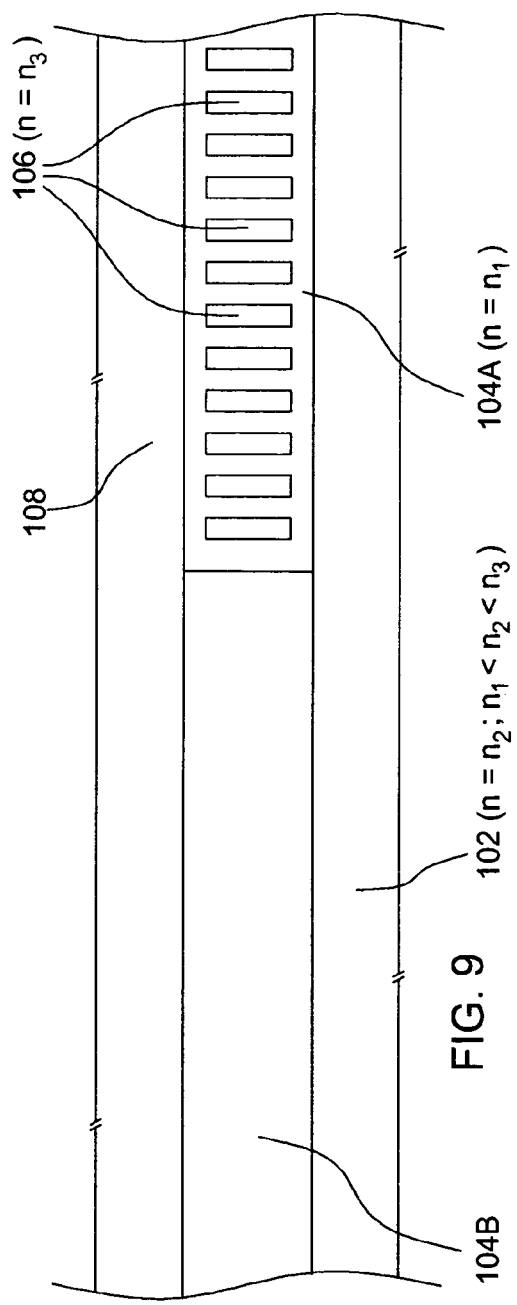
FIG. 9 is a schematic longitudinal section of a planar waveguide.

An alternative approach for improving mode-matching between diffracting and non-diffracting regions of the planar waveguide is illustrated schematically in the exemplary embodiment of FIG. 9. Core 104A comprises core material with refractive index $n_1$, and diffractive elements 106 comprise material with diffractive index $n_3$. Core 104B comprises material with refractive index $n_2$, with $n_1 < n_2 < n_3$. By suitable choice of $n_1$, $n_2$, and $n_3$ (the choices will depend on the dimensions of the diffractive elements 106 and cores 140A and 104B), the effective index of cores 104A and 104B may be made substantially equal. If they are the same thickness, then the respective optical modes will have substantially similar transverse extents, thereby increasing optical coupling and reducing optical loss.

Figure 13:
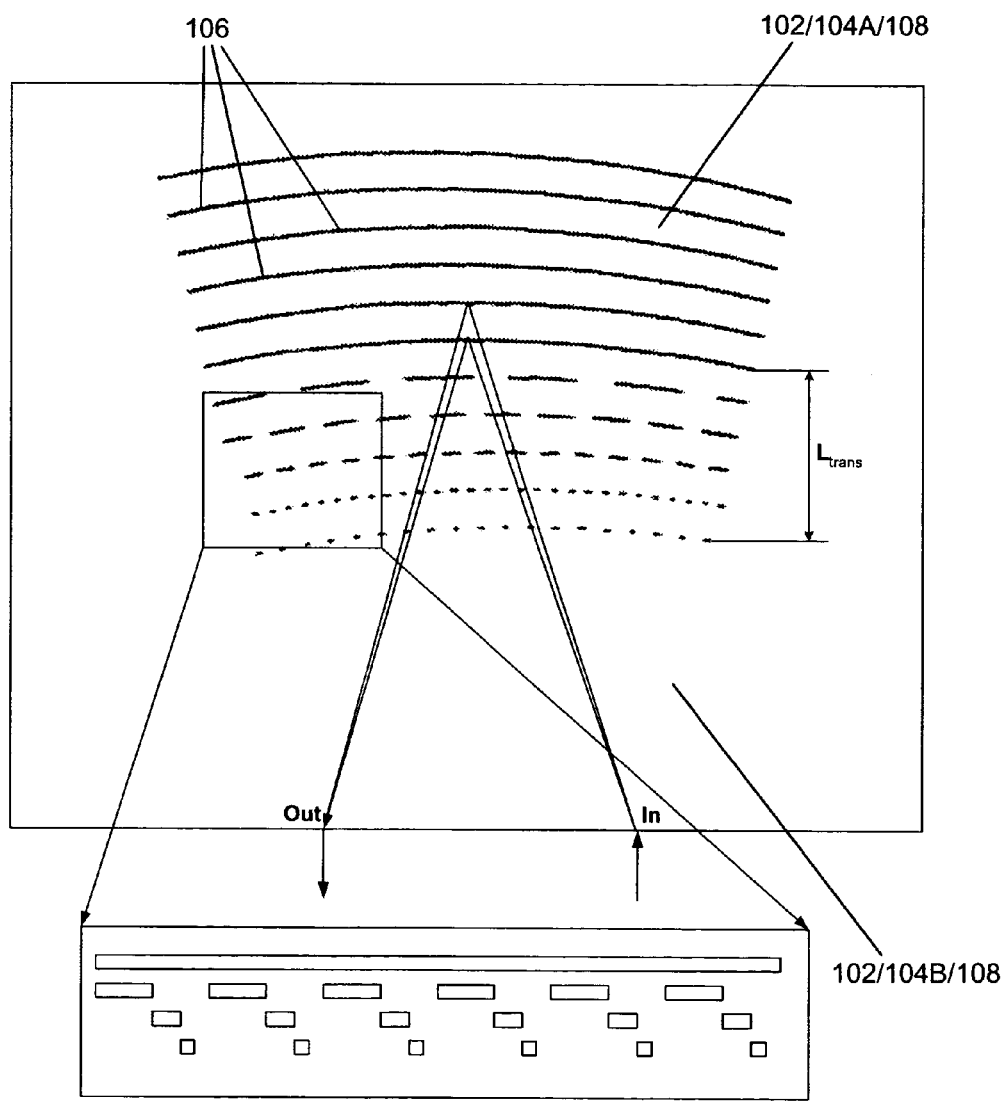
FIG. 13 is a schematic top view of a planar waveguide.

Instead of matching the respective optical modes supported by the diffractive and non-diffractive regions of the planar waveguide, an operationally acceptable level of optical coupling between the modes may be achieved by substantially adiabatic coupling in a transition region of the planar waveguide, between the diffracting and non-diffracting regions. The perturbation of the optical mode size, position, and/or shape induced by the presence of the diffractive elements increases gradually from the non-diffracting region through the transition region toward the diffracting region over a length $L_{trans}$. Sufficiently gradual variation of the diffractive elements results in a smooth evolution of the non-diffractive-region optical mode into the diffractive-region optical mode across the transition region, thereby reducing optical loss to an operationally acceptable level. The gradual appearance of the diffractive elements may be achieved in a variety of ways, alone or in combination. Properties of the diffractive elements that may be varied across the transition region of the planar waveguide include the transverse extent of the diffractive elements (in the confined dimension; FIG. 10), the longitudinal extent of the diffractive elements (FIG. 11), the index of refraction of the diffractive elements (FIG. 12), the fill-factor for the diffractive elements (FIG. 13), and/or the number density of the diffractive elements (FIG. 14). In all these examples, the perturbation of the optical mode by the presence of the diffractive elements is gradually increased. Any sufficiently gradual, substantially monotonic variation may be implemented for any of these diffractive element properties, including linear variation, quadratic variation, sinusoidal variation, exponential variation, logarithmic variation, gaussian variation, and so forth. Varying the fill factor, number density, and/or width are described in detail in U.S. Pat No. 6,678,429 and application Ser. No. 10/653,876 (cited hereinabove), and these may be readily implemented with standard binary lithography techniques. Varying the transverse extent (i.e. depth) or refractive index of the diffractive elements may require more complex fabrication techniques, such as grayscale lithography, for example. It should be noted that the diffractive element set of the transition region may exhibit its own transfer function, and/or may direct optical signal to its own output port. Such output may serve some useful function in an optical apparatus. Alternatively, the diffractive element set of the transition region may be intentionally configured to substantially eliminate diffraction of optical signals within the operational wavelength range of an optical device. For example, the diffractive elements may be arranged to have a resonant wavelength output the operating wavelength range of the device. The presence of such non-resonant diffractive elements modifies the spatial properties of the planar waveguide modes without unwanted diffraction of optical signal in the transition region.

Exemplary materials and dimensions for varying the diffractive element fill factor (FIG. 13), and simulation results therefor, are as follows. Cladding 102 and 108 comprise undoped silica (n=1.446); cores 104A and 104B each comprise Ge-doped silica (n=1.457) about 3.8 µm thick; diffractive elements 106 comprise silicon oxynitride (n=1.557), are positioned symmetrically within the core 104A, are about 0.265 µm wide and about 1 µm deep, and have a period of about 0.53 µm (resonant diffracted wavelength about 1.54 µm). In the transition region, diffractive elements 106 on the core are nominally divided into 50 segments (chosen so that amplitude variation of the optical signal across a segment is negligible; filled segments should be substantially uniformly distributed along the diffractive element). Spatial periodicity of the segments of the partially-filled diffractive elements may result in undesirable diffraction maxima at other diffraction angles. In order to suppress such maxima, the angle subtended by each segment may be varies randomly and/or gradually among the diffractive elements. In the exemplary embodiment, none of the segments are filled with a diffractive element segment about 200 µm away from the diffracting region. The fraction of nominal segments that are filled with a diffractive element segment increases with a sinusoidal variation until it reaches unity at the diffracting region. With no transition region between cores 104A and 104B, optical coupling between the modes is about 80%. With the transition region, the optical coupling between the modes is essentially 100% (negligible optical loss). Many other suitable combinations of materials and dimensions may be implemented, and shall fall within the scope of the present disclosure and/or appended claims.

Exemplary materials and dimensions for varying the diffractive element number density (FIG. 14), and simulation results therefor, are as follows. Cladding 102 and 108 comprise undoped silica (n=1.446); cores 104A and 104B each comprise Ge-doped silica (n=1.457) about 2 µm thick; diffractive elements 106 comprise silicon oxynitride (n=1.53) filling grooves etched into the surface of the core about 0.75 µm deep and about 0.265 µm wide. The period of the diffractive elements 106 on the core is about 0.53 µm (resonant diffracted wavelength about 1.54 µm). In the transition region, diffractive elements 106 begin with a period of about 2.65 µm about 300 µm away from the diffracting region, and the period decreases with a sinusoidal variation until it reaches about 0.53 µm at the diffracting region. With no transition region between cores 104A and 104B, optical coupling between the modes is about 66% (optical loss about 1.8 dB). With the transition region, the optical coupling between the modes is essentially 100% (negligible optical loss). Many other suitable combinations of materials and dimensions may be implemented, and shall fall within the scope of the present disclosure and/or appended claims. In some instances it may be desirable or necessary to design the variation through the transition region so as to substantially avoid optical coupling into unwanted optical modes, particularly unwanted modes at or near the operational design wavelength of the diffractive element set.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the Figures. The numbers of diffractive elements is reduced in the Figures for clarity. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

What is claimed is:

1. An optical apparatus, comprising a planar optical waveguide having at least one set of diffractive elements, the planar optical waveguide substantially confining in at least one transverse spatial dimension optical signals propagating therein, wherein:

each diffractive element set routes, between corresponding input and output optical ports, a corresponding diffracted portion of an input optical signal propagating in the planar waveguide that is diffracted by the diffractive element set;

the input optical signal is successively incident on the diffractive elements;

the optical signals propagate in the planar waveguide in corresponding diffractive-region optical transverse modes in regions of the planar waveguide where the diffractive elements are present;

the optical signals propagate in the planar waveguide in corresponding non-diffractive-region optical transverse modes in regions of the planar waveguide where the diffractive elements are absent; and the diffractive element set or the planar optical waveguide is adapted so as to yield an operationally acceptable level of (i) optical coupling between corresponding diffractive-region and non-diffractive-region optical transverse modes, or (ii) diffraction efficiency of the diffractive element set, and wherein the adaptation of the diffractive element set or the planar optical waveguide comprises:

diffractive elements having sufficiently large transverse extent in the confined dimension so as to substantially suppress optical coupling between diffractive-region optical modes and non-confined optical modes;

diffractive elements positioned in the confined dimension so as to spatially overlap the diffracting-region optical mode at or near a spatial maximum of the amplitude thereof;

diffractive elements having sufficiently large refractive index and sufficiently large transverse extent in the confined dimension so as to yield diffractive-region optical modes that substantially spatially overlap the diffractive elements;

a planar waveguide core in a non-diffracting region of the planar waveguide that is offset in the confined dimension relative to a planar waveguide core in a diffracting region of the planar waveguide;

a planar waveguide core in a non-diffracting region of the planar waveguide that differs in transverse extent, in the confined dimension, from a planar waveguide core in a diffracting region of the planar waveguide;

a planar waveguide core in the non-diffracting region with a refractive index higher than a refractive index of a planar waveguide core in the diffracting region and lower than a refractive index of the diffractive elements;

a transition region of the planar waveguide between the diffracting region and the non-diffracting region wherein a less-than-unity fill factor for the diffractive elements increases from the non-diffracting region toward the diffracting region;

a transition region of the planar waveguide between the diffracting region and the non-diffracting region wherein number density of the diffractive elements increases from the non-diffracting region toward the diffracting region;

a transition region of the planar waveguide between the diffracting region and the non-diffracting region wherein longitudinal extent of the diffractive elements increases from the non-diffracting region toward the diffracting region;

a transition region of the planar waveguide between the diffracting region and the non-diffracting region wherein transverse extent in the confined dimension of the diffractive elements increases from the non-diffracting region toward the diffracting region; or a transition region of the planar waveguide between the diffracting region and the non-diffracting region wherein refractive index of the diffractive elements increases from the non-diffracting region to the diffracting region.

2. The apparatus of claim 1, wherein the adaptation comprises diffractive elements having sufficiently large transverse extent in the confined dimension so as to substantially suppress optical coupling between diffractive-region optical modes and non-confined optical modes.

3. The apparatus of claim 2, wherein a range of diffraction angles from a diffractive element, determined in part by the transverse extent of the diffractive element, are smaller than a diffraction angle for optical coupling between a diffractive-region optical mode and the non-confined optical modes.

4. The apparatus of claim 2, wherein the transverse extent of the diffractive elements is greater than or about equal to an in-waveguide wavelength of the optical signals.

5. The apparatus of claim 2, wherein the transverse extent of the diffractive elements results in a minimum diffracted amplitude at a diffracted angle substantially coinciding with a diffraction angle for optical coupling between a diffractive-region optical mode and a non-confined optical mode.

6. The apparatus of claim 2, wherein the diffractive elements each comprise multiple segments positioned along the confined dimension and sized so as to result in a minimum diffracted amplitude at a diffracted angle substantially coinciding with a diffraction angle for optical coupling between a diffractive-region optical mode and a non-confined optical mode.

7. The apparatus of claim 1, wherein the adaptation comprises diffractive elements positioned in the confined dimension so as to spatially overlap the diffracting-region optical mode at or near a spatial maximum of the amplitude thereof.

8. The apparatus of claim 7, wherein the diffractive elements are positioned substantially symmetrically along the confined dimension, so as to substantially overlap spatially the amplitude maximum of a lowest-order diffracting-region optical mode.

9. The apparatus of claim 1, wherein the adaptation comprises diffractive elements having sufficiently large refractive index and sufficiently large transverse extent in the confined dimension so as to yield diffractive-region optical modes that substantially spatially overlap the diffractive elements.

10. The apparatus of claim 9, wherein:
the planar waveguide comprises silica cladding and a silica core doped to have a larger refractive index than the cladding; and
the diffractive elements comprise silica doped to have a larger refractive index than the core.

11. The apparatus of claim 9, wherein:
the planar waveguide comprises silica cladding and a silica core doped to have a larger refractive index than the cladding; and
the diffractive elements comprise silicon oxynitride and have a larger refractive index than the core.

12. The apparatus of claim 11, wherein the diffractive elements are larger than about 0.1 μm in transverse extent in the confined dimension.

13. The apparatus of claim 11, wherein the diffractive elements have a refractive index larger than about 1.5.

14. The apparatus of claim 1, wherein the adaptation comprises a planar waveguide core in a non-diffracting region of the planar waveguide that is offset in the confined dimension relative to a planar waveguide core in a diffracting region of the planar waveguide.

15. The apparatus of claim 14, wherein the offset of the waveguide cores results in substantial alignment in the confined dimension of respective amplitude maxima of the diffractive-region optical modes and corresponding non-diffractive-region optical modes.

16. The apparatus of claim 1, wherein the adaptation comprises a planar waveguide core in a non-diffracting region of the planar waveguide that differs in transverse extent, in the confined dimension, from a planar waveguide core in a diffracting region of the planar waveguide.

17. The apparatus of claim 16, wherein the difference in transverse extent of the respective cores results in substantially similar sizes in the confined dimension of the diffractive-region optical modes and corresponding non-diffractive-region optical modes.

18. The apparatus of claim 1, wherein the adaptation comprises a planar waveguide core in the non-diffracting region with a refractive index higher than a refractive index of a planar waveguide core in the diffracting region and lower than a refractive index of the diffractive elements.

19. The apparatus of claim 18, wherein the refractive indices and transverse extents of the waveguide cores and diffractive elements result in diffractive-region optical modes and the corresponding non-diffractive-region optical modes that are substantially similar in transverse extent.

20. The apparatus of claim 1, wherein the adaptation comprises a transition region of the planar waveguide between the diffracting region and the non-diffracting region wherein a less-than-unity fill factor for the diffractive elements increases from the non-diffracting region toward the diffracting region.

21. The apparatus of claim 20, wherein spatial variation of the fill factor of the diffractive elements in the transition region of the planar waveguide is sufficiently gradual so as to result in substantially adiabatic optical coupling between diffractive-region optical modes and corresponding non-diffractive-region optical modes.

22. The apparatus of claim 1, wherein the adaptation comprises a transition region of the planar waveguide between the diffracting region and the non-diffracting region wherein number density of the diffractive elements increases from the non-diffracting region toward the diffracting region.

23. The apparatus of claim 22, wherein spatial variation of the number density of the diffractive elements in the transition region of the planar waveguide is sufficiently gradual so as to result in substantially adiabatic optical coupling between diffractive-region optical modes and corresponding non-diffractive-region optical modes.

24. The apparatus of claim 1, wherein the adaptation comprises a transition region of the planar waveguide between the diffracting region and the non-diffracting region wherein transverse extent in the confined dimension of the diffractive elements increases from the non-diffracting region toward the diffracting region.

25. The apparatus of claim 24, wherein spatial variation of the transverse extent of the diffractive elements in the transition region of the planar waveguide is sufficiently gradual so as to result in substantially adiabatic optical coupling between diffractive-region optical modes and corresponding non-diffractive-region optical modes.

26. The apparatus of claim 1, wherein the adaptation comprises a transition region of the planar waveguide between the diffracting region and the non-diffracting region wherein longitudinal extent of the diffractive elements increases from the non-diffracting region toward the diffracting region.

27. The apparatus of claim 26, wherein spatial variation of the longitudinal extent of the diffractive elements in the transition region of the planar waveguide is sufficiently gradual so as to result in substantially adiabatic optical coupling between diffractive-region optical modes and corresponding non-diffractive-region optical modes.

28. The apparatus of claim 1, wherein the adaptation comprises a transition region of the planar waveguide between the diffracting region and the non-diffracting region wherein refractive index of the diffractive elements increases from the non-diffracting region to the diffracting region.

29. The apparatus of claim 28, wherein spatial variation of the refractive index of the diffractive elements in the transition region of the planar waveguide is sufficiently gradual so as to result in substantially adiabatic optical coupling between diffractive-region optical modes and corresponding non-diffractive-region optical modes.

30. The apparatus of claim 1, wherein the optical element comprises a slab waveguide, the slab waveguide substantially confining in one transverse dimension optical fields propagating in two dimensions therein.

31. The apparatus of claim 1, wherein the optical element comprises a channel waveguide, the channel waveguide substantially confining in two transverse dimensions optical fields propagating in one dimension therein.

32. The apparatus of claim 1, wherein the planar waveguide comprises a core and lower-index cladding for substantially confining optical fields propagating therein.

33. The apparatus of claim 32, wherein the diffractive elements comprise grooves in the core, the grooves being filled with material having a refractive index larger than that of the core.

34. The apparatus of claim 32, wherein the diffractive elements comprise grooves in the core, the grooves being filled with cladding.

35. The apparatus of claim 32, wherein the diffractive elements comprise ridges of the core protruding into the cladding.

36. The apparatus of claim 32, wherein the diffractive elements comprise ridges, protruding into the cladding from the core, of material having a refractive index larger than that of the core.

37. The apparatus of claim 32, wherein the diffractive elements are positioned within the core.

38. The apparatus of claim 32, wherein the diffractive elements span the core in at least one confined dimension.

39. The apparatus of claim 1, wherein the diffractive elements comprise lithographically-formed elements.

40. The apparatus of claim 1, wherein the diffractive elements comprise localized regions of the waveguide differing from adjacent regions of the waveguide in optically-induced density.

41. The apparatus of claim 1, wherein the diffractive elements comprise localized regions of the waveguide differing from adjacent regions of the waveguide in mechanically-induced density.

42. The apparatus of claim 1, wherein the diffractive elements comprise localized regions of the waveguide differing from adjacent regions of the waveguide in dopant concentration.

43. The apparatus of claim 1, wherein the diffractive elements comprise holographically-formed elements.

* * * * *